United States Patent

Cipolli et al.

[11] 4,193,763
[45] Mar. 18, 1980

[54] DYEING AND PRINTING OF WATER-SWELLABLE CELLULOSE MATERIAL AND BLENDS THEREOF WITH SYNTHETIC FIBRES, BY MEANS OF DISAZO DYES DERIVED FROM AMINO-PYRAZOLE

[75] Inventors: Roberto Cipolli; Gioacchino Boffa, both of Novara, Italy

[73] Assignee: Aziende Colori Nazionali Affini Acna S.p.A., Milan, Italy

[21] Appl. No.: 875,937

[22] Filed: Feb. 7, 1978

[30] Foreign Application Priority Data

Feb. 7, 1977 [IT] Italy ............................. 20004 A/77

[51] Int. Cl.² ............................................. D06P 3/82
[52] U.S. Cl. ..................................... 8/21 C; 8/41 R; 8/54.2; 8/93
[58] Field of Search ............... 8/21 C, 41 R, 54.2, 8/93

[56] References Cited

U.S. PATENT DOCUMENTS

| | | | |
|---|---|---|---|
| 3,667,897 | 6/1972 | Blackwell et al. | 8/21 C |
| 3,706,525 | 12/1972 | Blackwell et al. | 8/21 C |
| 3,711,245 | 1/1973 | Neumer | 8/21 R |
| 3,744,967 | 7/1973 | Thackrah | 8/21 C |
| 3,752,645 | 8/1973 | McGuire | 8/21 C |
| 3,752,646 | 8/1973 | Blackwell | 8/21 C |
| 3,752,647 | 8/1973 | Mentzer | 8/21 C |
| 4,049,377 | 9/1977 | Schwab et al. | 8/21 C |

Primary Examiner—A. Lionel Clingman
Attorney, Agent, or Firm—Morgan, Finnegan, Pine, Foley & Lee

[57] ABSTRACT

This invention relates to a class of disazo dyes that are useful to dye and print water-swellable cellulose material and blends thereof with synthetic materials, and, in particular, to dye and print polyester-cotton blends.

More particularly, the process of this invention relates to a process or method for dyeing and printing fabrics of water-swellable cellulose material and blends thereof with synthetic materials, in particular polyester-cotton mixed fibres, such process comprising the dyeing and printing of the material in the presence of water and of a high-boiling solvent, capable of maintaining cellulose in the swollen state at the application temperature, with disazo dyes having general formula (I):

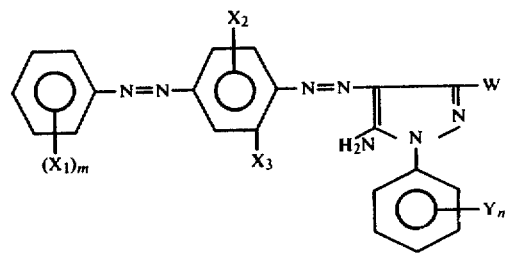

wherein:
$X_1$ = a hydrogen, alkyl or alkoxyl having 1 to 4 atoms of carbon, chlorine, bromine, —CN, —NHCOR$_1$, —NHCO—Ar, —COOR, —CON(R$_1$)$_2$, —NO$_2$;
$X_2$ = a hydrogen, alkyl or alkoxyl having 1 to 4 atoms of carbon, chlorine, bromine, —NHCOR$_1$, —NHCO—Ar;
$X_3$ = an alkyl or alkoxyl having 1 to 4 carbon atoms, or —NHCOR$_1$ or —NHCO—Ar;
Y = H, an alkyl or alkoxyl having 1 to 4 atoms of carbon, chlorine, bromine;
W = a hydrogen or alkyl C$_{1-4}$;
R = an alkyl C$_1$-C$_4$;
R$_1$ = a hydrogen or alkyl C$_{1-4}$;
Ar = a phenyl optionally substituted;
m and m are integers from 1 to 3.

4 Claims, No Drawings

DYEING AND PRINTING OF WATER-SWELLABLE CELLULOSE MATERIAL AND BLENDS THEREOF WITH SYNTHETIC FIBRES, BY MEANS OF DISAZO DYES DERIVED FROM AMINO-PYRAZOLE

BACKGROUND OF THE INVENTION

Processes for dyeing polyester-cotton mixed fibres and comprising more than one step, where the blend components are dyed in separate steps with different dyes, are already known.

These processes exhibit serious drawbacks, such as complex realization, possibility of reciprocal spotting, necessity of using high amounts of dyes.

One of these dyeing processes is described, for example, in U.S. Pat. No. 3,313,590.

Processes for dyeing polyester-cotton mixed fibres, utilizing the capability of the cellulose material of being swollen by water are known too.

It is known in fact that cotton fibres and cellulose materials are quickly swellable with water, and that swelling is accelerated by the action of wetting agents and/or of heat.

Such swollen materials have modified physical and mechanical properties, i.e. an opener structure, a lower mechanical resistance, a higher flexibility, wherefore they are more easily penetrated by reactive agents and/or dyes.

It is also known that cotton can be treated with water-soluble dyes when it is swollen with water containing high-boiling water-soluble solvents having a delimited molecular weight (polyoxyethylene glycol). This process has been mentioned by E. I. Valko and K. M. Limdi in "Textile Research Journal" 32, 331-7 (1962).

According to the Authors such method is applicable also for introducing into cotton materials insoluble in water, but soluble in the above-mentioned water-soluble high-boiling solvents.

This method has been followed by J. Blackwell et al., who have described, in U.S. Pat. No. 3,706,525, the application, in an only step, of water-insoluble dyes preformed on swellable cellulose and/or blends thereof with synthetic fibres such as, for instance, polyester and polyamide fibres, by using high-boiling solvents such as polyols and ethers and esters thereof, which keep cellulose in the swollen state also after evaporation of water during the intermediate drying step of the thermosol process.

The dyes to be employed according to the last described process shall meet the following important requirements:

good affinity for polyester fibres,
good affinity for cellulose fibres swellable by the water-solvent mixture,
low tendency to sublimation at the application temperature,
capability of providing uniform dyeings on both fibres,
capability of providing dyeings and printings resistant to sunlight, to rubbing, to washing.

OBJECTS OF THE INVENTION

It is an object of the present invention to provide a class of dyes suitable for dyeing and printing water-swellable cellulose material and blends thereof with synthetic materials, in particular polyester-cotton blends (for example 65-80/20-35), polyester-rayon blends, according to the earlier described technology, i.e., according to substantially conventional operative modalities of the "thermosol" type, in the presence of solvents capable of maintaining cellulose in the swollen state at the application temperature.

Another object of this invention is to provide an improved process for dyeing and printing fabrics of polyester-cellulose blend which exhibit a good affinity for both components of the blend and provide a uniform shade and excellent general stabilities.

Other objects of the invention will be apparent from the discussion which follows.

SUMMARY OF THE INVENTION

Process for dyeing and printing fabrics of water-swellable cellulose material and blends thereof with synthetic materials, in particular polyester-cotton mixed fibres, such process comprising the dyeing and printing of the material in the presence of water and of a high-boiling solvent, capable of maintaining cellulose in the swollen state at the application temperature, with disazo dyes having general formula (I):

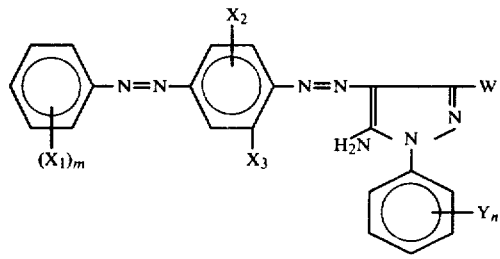

wherein:

$X_1$ = a hydrogen, alkyl or alkoxyl having 1 to 4 atoms of carbon, chlorine, bromine, —CN, —NHCOR$_1$, —NHCO—Ar, —COOR, —CON(R$_1$)$_2$, —NO$_2$;

$X_2$ = a hydrogen, alkyl or alkoxyl having 1 to 4 atoms of carbon, chlorine, bromine, —NHCOR$_1$, —NHCO—Ar;

$X_3$ = an alkyl or alkoxyl having 1 to 4 carbon atoms, or —NHCOR$_1$ or —NHCO—Ar;

Y = H, an alkyl or alkoxyl having 1 to 4 atoms of carbon, chlorine, bromine;

W = a hydrogen or alkyl C$_{1-4}$;

R = an alkyl C$_1$–C$_4$;

R$_1$ = a hydrogen or alkyl C$_{1-4}$;

Ar = a phenyl optionally substituted;

m and m are integers from 1 to 3.

GENERAL DESCRIPTION OF THE INVENTION

It has been found that the objects of this invention may be realized by employing a dyeing process that utilizes dyes having the following general formula:

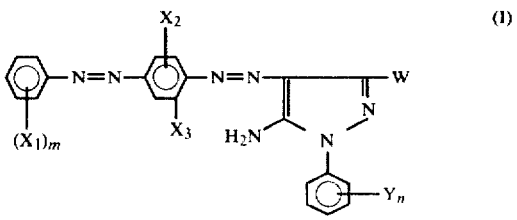

(I)

wherein:
X₁ = a hydrogen, alkyl or alkoxyl having 1 to 4 atoms of carbon, chlorine, bromine, —CN, —NHCOR₁, —NHCO Ar, —COOR, —CON(R₁)₂, —NO₂;
X₂ = a hydrogen, alkyl or alkoxyl having 1 to 4 atoms of carbon, chlorine, bromine, NHCOR₁, NHCO Ar;
X₃ = an alkyl or alkoxyl having 1 to 4 atoms of carbon, or —NHCOR₁ or —NHCO Ar;
Y = H, an alkyl or alkoxyl having 1 to 4 atoms of carbon, chlorine, bromine;
W = hydrogen or alkyl C₁₋₄;
R = alkyl C₁–C₄;
R₁ = hydrogen or alkyl C₁₋₄;
Ar = phenyl optionally substituted;
m and n are integers from 1 to 3.

The nature of the dyes used in accordance with the present invention is important. It can be observed, for instance, that, while the dyes of the present invention prepared from 1-phenyl-5-amino-pyrazol are successfully utilized to dye and print polyester-cellulose blends, the dyes of analogous structure prepared from 1-phenyl-5-pyrazolone provide unsatisfactory results, as they show, under the applicative conditions, a strong sublimability.

Such drawback is particularly undesirable in the printing operations, as it leads to soiling of the ground.

The dyes of general formula (I), described earlier, surprizingly exhibit a good affinity for both components of the polyester-cellulose blend, a uniform shade and excellent general stabilities.

The class of dyes of general formula (I) is prepared according to conventional methods, by diazotizing, in an aqueous acid medium, an amine of formula:

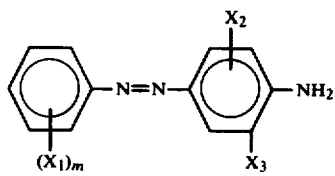

and by coupling, always in an aqueous medium, preferably at a pH value of 4–5, the diazo so obtained with a derivative of 1-phenyl-5-amino-2-pyrazole, of formula:

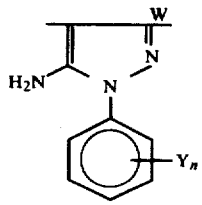

in whose two formulas symbols X₁, X₂, X₃, W, Y, m and n have the meanings defined hereinbefore.

The dyes so prepared are ground in the presence of suitable dispersing agents, such as, for example, sodium lignin-sulphonate or Saltetra SS, up to a particle size of 0.5–1μ, and are applicated to the mixed fibres in the form of aqueous slurries added with a solvent of the type described hereinabove and selected from among those usually employed for such technique, such as, e.g., those cited by I. Valko and M. Limdi in "Textile Research Journal", 331 (1962), indicated in the cited U.S. Pat. No. 3,706,525, in Japanese Pat. Nos. 7,571,983 (C.A. 83 (1975) 207486x), and 7,571,984 (C.A. 83 (1975) 207487y) and in Italian patent applications Nos. 27,437 A/75 and 22,803 A/76 in the name of the Applicant.

The dyeings or printings are heat-set at 180°–230° C. for 0.5–3 minutes and soaped to remove not fixed dye, if any.

SPECIFIC DESCRIPTION OF THE INVENTION

The following examples are given to illustrate the modalities for practicing the present invention, without being however a limitation thereof. The stability tests have been carried out according to standards UNI. The covering indicates the distribution degree of the dye on the two fibres. The soiling of the ground is correlated with the dye sublimability.

Unless otherwise specified, the term "parts" is to be understood as expressed in weight unit.

In the following examples, Diapon T is sodium oleyl-methyltaurinate detergent produced by Montedison, Milan, Italy, having the formula CH₃(CH₂)₇CH=CH(CH₂)₇CON(CH₃)C₂H₄SO₃Na.

EXAMPLE 1

8.0 parts of a dye having the structure:

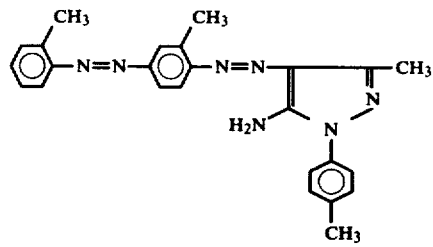

were microfined with 8.0 parts of Saltetra SS (a condensate of formaldehyde, m- and p-cresol, Schaffer acid), 12.0 parts of ethylene glycol and 105 parts of water. From such mixture there were prepared 1000 parts of a printing paste by addition of 100 parts of monomethyl-ether of polyoxyethylene glycol (M.W.=about 350), of 37 parts of sodium alginate and of 730 parts of water.

Such paste was applied to a fabric made of a polyester-cotton 65/35 mixed fibre, scoured for printing, and then allowed to dry in air (about 20 minutes).

The dye setting on both fibres composing the blend was obtained in a thermosol apparatus, by operating at 200° C. for 60 seconds. The heat-set printing was subjected to a 3-step cleaning process:
1—cold washing
2—soaping (10 minutes, 90° C., 1 g/l of Diapon T ®),
3—rinsing.

An orange shade printing, perfectly uniform, with sharp outlines and a white ground was thus obtained.

The intensity was of ⅛ (E.C.E.). At this intensity, the following data were determinated:
blend covering: good
setting: excellent
ground soiling: none
stability to rubbing: excellent
stability to washing at 60° C.: excellent,
as regards both the alternation of the blend shade and the discoloration either on polyester or on cotton.

The dyes was synthetised as follows: 2.25 parts of o-amino-azotoluene were dispersed with 4.0 ml of HCl, d=1.14, and with 30 ml of water.

After cooling of the mass to 0°–5° C., it was diazotized by gradually adding 0.69 parts of sodium nitrite in 10 ml of water.

After a further 30-minute stirring, the diazo solution was clarified and poured at 5°–10° C. onto a solution of 1.87 parts of 1-p-tolyl-3-methyl-5-amino-2-pyrazol in 10 ml of acetic acid.

During the coupling the pH was kept at a value of 4–5 by addition of sodium acetate in crystals.

After a 2-hour stirring at 5°–10° C., the whole was filtered, —the cake was washed with water until neutralization and dried.

3.85 parts of dye were obtained.

EXAMPLE 2

In a conventional apparatus for the continuous dyeing ("Pad-fix"), a light cloth fabric of a cotton-polyester 65/35 blend, previously scoured, was padded by using a 10% dispersion of the dye of example 1, and a padding bath having the following composition:

|  |  |
|---|---|
| dye dispersion at 10% | 25 parts |
| water | 775 parts |
| polyoxyethylene glycol monomethyl-ether (M.W. about 350) | 100 parts |
| Lamitex L-10 at 2% (a thickening substance based on sodium alginate) | 100 parts |

The padded fabric was squeezed in a ratio of 80% in respect of the fibre weight, whereupon it was dried for 1 minute at 90° C. and then heat-set for 1 minute at 200° C.

The dyed fabric was subjected to a 3-step cleaning process:
1—cold washing,
2—soaping (15 minutes, 90° C., 1 g/l of Diapon T ®,
3—rinsing.

An orange shade dyeing, perfectly equalized at an intensity of about ½, was thus obtained, whose characteristics were as follows:
covering of the blend: good
setting: good
soiling of the ground: none
fastness to rubbing: excellent
fastness to light: good
fastness to washing: excellent.

EXAMPLE 3

8.0 parts of the same dye of example 1 were utilized for preparing 1000 parts of printing paste according to the process described in example 1, but using as a solvent, instead of polyoxyethylene glycol monomethyl ether, 100 parts of phosphoric ester having the following structure:

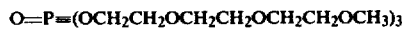

O=P=(OCH₂CH₂OCH₂CH₂OCH₂CH₂OCH₃)₃

A thoroughly uniform orange shade printing was obtained, whose characteristics, at an intensity of ½ (E.C.E.), were as follows:
covering of the blend: excellent
setting: good
soiling of the ground: none
fastness to rubbing: good
fastness to light: good
fastness to washing at 60° C.: good.

EXAMPLE 4

By operating according to the modalities of example 1, the same material was printed with a dye having the following structure:

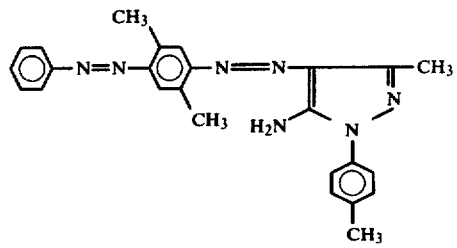

thus obtaining a perfectly uniform yellow-orange shade printing, whose characteristics were as follows:
covering of the blend: good
setting: good
soiling of the ground: none
stability to rubbing: good
stability to light: good
stability to washing at 60° C.: excellent.

The dye was synthesized according to a procedure analogous with that of example 1.

EXAMPLE 5

Following the procedure of example 1, the same material was printed with a dye having the following structure:

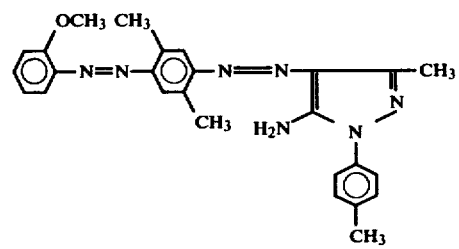

thus obtaining a thoroughly uniform orange shade printing, that exhibited the following characteristics at an intensity of ½ (E.C.E.):
covering of the blend: good
setting: good
soiling of the ground: none
stability to rubbing: good
stability to light: good
stability to washing at 60° C.: good.

The dye was synthesized according to a procedure similar to that of example 1.

EXAMPLE 6

By operating according to example 1, the same material was printed with a dye having the following structure:

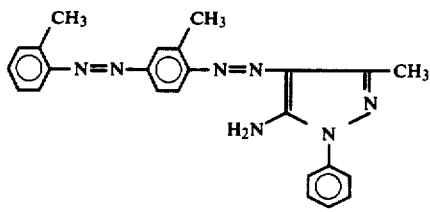

thus obtaining a thoroughly uniform orange shade printing that, at an intensity of ½ (E.C.E.) exhibited the following characteristics:
  covering of the blend: good
  setting: good
  soiling of the ground: none
  stability to rubbing: excellent
  stability to light: good
  stability to washing at 60° C.: excellent.

The dye was synthesized according to modalities similar to those of example 1.

EXAMPLE 7

Following the method described in example 1, the same material was printed with a dye having the following structure:

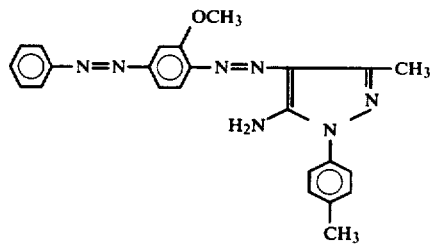

A thoroughly uniform orange-red shade printing was obtained, whose characteristics, at an intensity of ½ (E.C.E.), were as follows:

covering of the blend: good
  setting: good
  soiling of the ground: none
  stability to rubbing: good
  stability to light: good
  stability to washing at 60° C.: excellent.

The dye was synthesized according to a procedure analogous with that of example 1.

EXAMPLE 8

Following the modalities described in example 1, the same material was printed with a dye having the following structure:

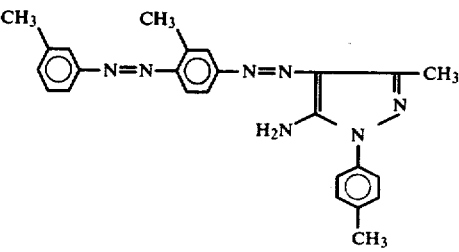

thus obtaining a thoroughly uniform gold-yellow shade printing, whose characteristics, at an intensity of ½ (E.C.E.), were as follows:
  covering of the blend: good
  setting: good
  soiling of the ground: none
  stability to rubbing: excellent
  stability to light: good
  stability to washing at 60° C.: excellent.

The dye was synthesized according to modalities similar to those of example 1.

EXAMPLES 9, 10, 11, 12, 13, 14, 15, 16

By operating according to the procedure described in example 1, the same material was printed with the dyes having the following structures:

| Example No. | Structure | Shade |
|---|---|---|
| 9 | | gold-yellow |
| 10 | | orange |

-continued

| Example No. | Structure | Shade |
|---|---|---|
| 11 | 2-Cl-C6H4-N=N-(2-Cl-C6H3)-N=N-[5-amino-3-methyl-1-(4-methylphenyl)pyrazol-4-yl] | orange |
| 12 | 3,4-di-Cl-C6H3-N=N-(2-Cl-C6H3)-N=N-[5-amino-3-methyl-1-(4-methylphenyl)pyrazol-4-yl] | orange |
| 13 | 3,4-di-Cl-C6H3-N=N-(2-OCH3-C6H3)-N=N-[5-amino-3-methyl-1-(4-methylphenyl)pyrazol-4-yl] | orange-red |
| 14 | 4-O2N-C6H4-N=N-(2,5-di-CH3-C6H2)-N=N-[5-amino-3-methyl-1-(4-methylphenyl)pyrazol-4-yl] | orange-red |
| 15 | 4-O2N-C6H4-N=N-(2-OCH3-C6H3)-N=N-[5-amino-3-methyl-1-(4-methylphenyl)pyrazol-4-yl] | reddish-brown |
| 16 | 4-O2N-C6H4-N=N-(2,5-di-OCH3-C6H2)-N=N-[5-amino-3-methyl-1-(4-methylphenyl)pyrazol-4-yl] | violet-blue |

The characteristics of the printings so obtained were similar to those of the preceding examples.

EXAMPLE 17 (comparative test)

By way of comparison, the following disazo pyrazole dye, having a structure very similar to that of the dyes of this invention:

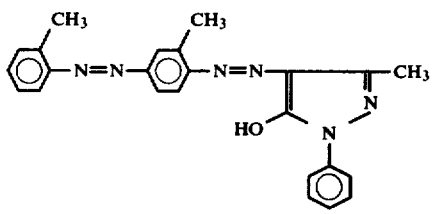

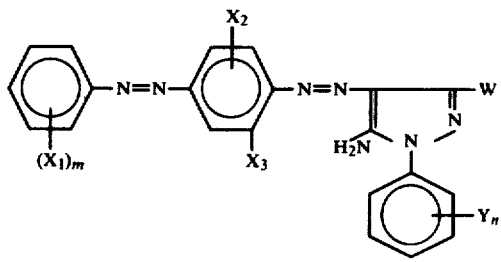

was applied by following the modalities illustrated in example 1.

An orange shade printing was obtained, having not well defined outlines and a remarkably soiled ground (what results even more clearly from the comparison with the material of example 1).

What we claim is:

1. Process for the dyeing and printing of fabrics comprised of water-swellable cellulose material and blends thereof with synthetic materials, said process comprising dyeing and printing the material in the presence of water and of a high-boiling solvent selected from the group consisting of polyols and ethers and esters thereof, said solvent being capable of maintaining cellulose in the swollen state at the application temperature, with disazo dyes having the general formula:

wherein:
$X_1$ = hydrogen, alkyl having 1 to 4 carbon atoms or alkoxyl having 1 to 4 carbon atoms, chlorine, bromine, —CN, —NHCOR$_1$, —NHCO—Ar, —COOR, —CON(R$_1$)$_2$, and —NO$_2$;
$X_2$ = hydrogen, alkyl having 1 to 4 carbon atoms or alkoxyl having 1 to 4 carbon atoms, chlorine, bromine, —NHCOR$_1$, —NHCO—Ar;
$X_3$ = alkyl having 1 to 4 carbon atoms or alkoxyl having 1 to 4 carbon atoms, or —NHCOR$_1$ or —NHCO—Ar;
Y = H, alkyl having 1 to 4 carbon atoms or alkoxyl having 1 to 4 carbon atoms, chlorine, bromine;
W = hydrogen or alkyl $C_{1-4}$;
R = an alkyl $C_1$–$C_4$;
$R_1$ = hydrogen or alkyl $C_1$–$C_4$;
Ar = a substituted or unsubstituted phenyl; and
m and n are integers from 1 to 3.

2. Cellulose materials and blends thereof with synthetic materials, dyed or printed according to the process defined in claim 1.

3. A process according to claim 1 wherein said fabric materials are polyester-cotton mixed fibres.

4. Articles according to claim 2 wherein said materials are cotton-polyester mixed fibres.

* * * * *